US009472984B2

(12) United States Patent
Taniguchi

(10) Patent No.: US 9,472,984 B2
(45) Date of Patent: Oct. 18, 2016

(54) ROTOR FOR ROTATING ELECTRIC MACHINE

(71) Applicant: DENSO CORPORATION, Kariya-city, Aichi-pref. (JP)

(72) Inventor: Makoto Taniguchi, Obu (JP)

(73) Assignee: DENSO CORPORATION, Kariya (JP)

( * ) Notice: Subject to any disclaimer, the term of this patent is extended or adjusted under 35 U.S.C. 154(b) by 211 days.

(21) Appl. No.: 13/962,223

(22) Filed: Aug. 8, 2013

(65) Prior Publication Data

US 2014/0062245 A1 Mar. 6, 2014

(30) Foreign Application Priority Data

Aug. 31, 2012 (JP) ................................ 2012-192029

(51) Int. Cl.
*H02K 1/27* (2006.01)

(52) U.S. Cl.
CPC ............... *H02K 1/27* (2013.01); *H02K 1/278* (2013.01); *H02K 1/2746* (2013.01)

(58) Field of Classification Search
CPC .................................................. H02K 1/278
USPC ..................................................... 310/156.28
See application file for complete search history.

(56) References Cited

U.S. PATENT DOCUMENTS

| 4,674,178 | A | * | 6/1987 | Patel | ................................ | 29/598 |
| 4,742,259 | A | * | 5/1988 | Schaefer | ................ | H02K 1/278 |
| | | | | | | 228/173.1 |
| 7,365,465 | B2 | * | 4/2008 | Ludwig | ................... | H02K 1/278 |
| | | | | | | 310/156.12 |
| 7,741,747 | B2 | * | 6/2010 | Yamamura | ............ | H02K 1/278 |
| | | | | | | 310/156.01 |
| 2006/0138894 | A1 | * | 6/2006 | Harada et al. | ................ | 310/217 |
| 2009/0102304 | A1 | * | 4/2009 | Yamamura et al. | ..... | 310/156.28 |
| 2011/0140562 | A1 | | 6/2011 | Kato et al. | | |
| 2011/0148240 | A1 | | 6/2011 | Koide et al. | | |
| 2011/0193440 | A1 | | 8/2011 | Yamada et al. | | |

FOREIGN PATENT DOCUMENTS

| JP | 02-246748 | 10/1990 |
| JP | 05-344699 | 12/1993 |
| JP | 2012-085445 | 4/2012 |

OTHER PUBLICATIONS

Office Action (2 pages) dated Oct. 21, 2014, issued in corresponding Japanese Application No. 2012-192029 and English translation (3 pages).

* cited by examiner

*Primary Examiner* — Naishadh Desai
(74) *Attorney, Agent, or Firm* — Nixon & Vanderhye P.C.

(57) ABSTRACT

A rotor includes a rotation shaft having a rotation axis; a rotator core fixed to the rotation shaft and having an axial end face and an outer circumference face; an end plate covering the axial end face of the rotator core; and a magnet cover covering the outer circumference face of the rotator core. The magnet cover has a first end portion adjacent to the end plate and a second end portion which is opposite to the first end portion in an axial direction. The first end portion of the magnet cover covers entire outer periphery edge of the end plate. The first end portion of the magnet cover is bent toward the rotation axis in entire outer periphery edge of the magnet cover.

14 Claims, 7 Drawing Sheets

ROTOR FOR ROTATING ELECTRIC MACHINE

CROSS REFERENCE TO RELATED APPLICATION

This application is based on Japanese Patent Application No. 2012-192029 filed on Aug. 31, 2012, the disclosure of which is incorporated herein by reference in its entirety.

TECHNICAL FIELD

The present disclosure relates to a rotor for a rotating electric machine.

BACKGROUND

JP-2012-085445A describes a motor as a rotating electric machine, and the motor includes a rotor.

The rotor has a rotation shaft, a rotator core, a magnet, a covering portion, and a magnet cover. The rotator core has a cylindrical shape and is made of a magnetic material to define a magnetic path. The rotator core is fixed to the rotation shaft. The magnet has cuboid shape and creates magnetic flux. The magnet is fixed to an outer periphery of the rotator core. The covering portion is made of a non-magnetic material and has an annular shape to cover an end face of the magnet and an end face of the rotator core, which are perpendicular to a rotation axis. The magnet cover is made of a non-magnetic material and has a cylindrical shape to cover the outer periphery of the magnet and the outer periphery of the rotator core having the magnet thereon.

The magnet fixed to the rotator core is covered by the covering portion and the magnet cover. Thus, by employing such a structure, when the magnet is chipped off, pieces of the magnet are restricted from scattering outside from the rotor.

However, an edge of the axial end of the magnet cover and a surface of the covering portion just abut with each other, so a gap may be generated between the magnet cover and the covering portion. If the gap arises, it is difficult to restrict the pieces of the magnet from scattering.

SUMMARY

To achieve the objective of the present disclosure, there is provided a rotor for a rotating electric machine, in which magnet pieces are restricted from scattering.

According to an example of the present disclosure, there is provided a rotor for a rotating electric machine. The rotor includes a rotation shaft having a rotation axis; a rotator core made of a magnetic material and fixed to the rotation shaft, the rotator core having an axial end face and an outer circumference face; a plurality of magnets arranged on the outer circumference face of the rotator core; an end plate made of a non-magnetic material and having a flat plate shape, the end plate covering the axial end face of the rotator core; and a magnet cover made of a non-magnetic material and having a cylindrical shape, the magnet cover covering the outer circumference face of the rotator core. The magnet cover has a first end portion adjacent to the end plate and a second end portion which is opposite to the first end portion in axial direction. The first end portion of the magnet cover covers entire outer periphery edge of the end plate. The first end portion of the magnet cover is bent toward the rotation axis in entire outer periphery edge of the magnet cover.

By employing such a structure, a gap can be restricted from arising between the magnet cover and the end plate more certainly than in a case where an edge of an axial end of the magnet cover and a surface of the end plate just abut with each other. Thus, if the magnets are chipped off, the pieces of the magnets are restricted from scattering.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
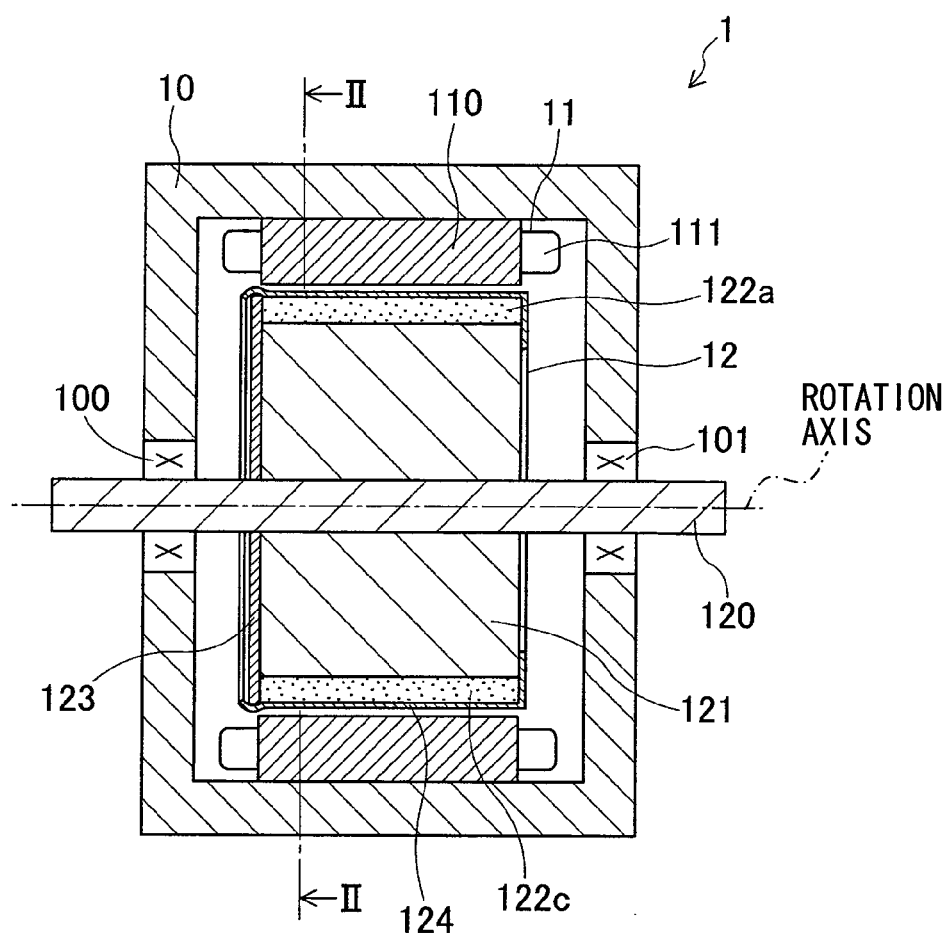
FIG. 1 is an axial sectional view illustrating a motor according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

A motor is employed as a rotating electric machine. The motor is used for electric power steering system disposed in a vehicle. A left side and a right side in FIG. 1 will be hereinafter referred to as a first side and a second side, respectively, in the following discussion. However, it should be noted that the first side and the second side are used for descriptive purpose only.

(First Embodiment)

A first embodiment will be described with reference to FIGS. 1-3.

As shown in FIG. 1, a motor 1 (i.e., a rotating electric machine) has a housing 10, a stator 11, and a rotor 12.

The housing 10 has the stator 11 and the rotor 12 therein so that the rotor 12 is rotatable. The housing 10 also has bearings 100 and 101.

The stator 11 defines a part of a magnetic path, and when a predetermined value of current flows in the stator 11, the stator 11 produces a rotating magnetic field. The stator 11 has a stator core 110 and a stator winding 111.

The stator core 110 made of a magnetic metallic material has a cylindrical shape, and holds the stator winding 111. The stator core 110 has slots. The slots are distanced from each other in a circumferential direction and extend in an axial direction from an end to the other end of the stator core 110. The stator core 110 is fixed on an inner periphery of the housing 10.

When a predetermined value of current flows inside the stator winding 111, the stator winding 111 produces a rotating magnetic field. The stator winding 111 is placed and retained in the slots of the stator core 110.

The rotor 12 defines a part of the magnetic path and produces magnetic flux. The rotor 12 produces a torque by using the rotating magnetic field produced by the stator 11. As shown in FIGS. 1-3, the rotor 12 has a rotation shaft 120, a rotator core 121, magnets 122a, 122b, 122c, 122d (hereafter may be referred as 122a-122d), an end plate 123, and a magnet cover 124.

The rotation shaft 120 is made of a non-magnetic metallic material and has a cylindrical shape. The rotation shaft 120 is fixed to the housing 10 via the bearings 100 and 101 so as to be rotatable.

The rotator core 121 made of a magnetic metallic material defines a part of the magnetic path, and retains the magnets 122a-122d. As shown in FIG. 2, the rotator core 121 has projecting portions 121a-121d on its outer periphery (i.e., an outer periphery of the rotator core 121). The projecting portions 121a-121d are distanced from each other in a circumferential direction and project in a radial direction. For example, the projecting portions 121a-121d are defined at regular intervals of 90-degrees in the circumferential direction. The projecting portions 121a-121d are defined so that radially outward surfaces of the projecting portions 121a-121d are curved surfaces (i.e., arc-like surfaces) which are concentric to the rotation axis. The rotator core 121 is fixed to the rotation shaft 120 so that the outer periphery of the rotator core 121 faces an inner periphery of the stator core 110, across a predetermined range of an air gap from the inner periphery of the stator core 110. The housing 10 supports the rotator core 121 to be rotatable.

The magnets 122a-122d have a flat plate shape and produce magnetic flux. As shown in FIG. 2, each of the magnets 122a-122d is fixed on the outer periphery of the rotator core 121, and the magnets 122a-122d are placed between the projecting portions 121a-121d. In other words, the magnets 122a-122d and the projecting portions 121a-121d are alternately arranged in the circumference direction. The magnets 122a-122d are fixed on the outer periphery of the rotator core 121 so that outer peripheries of the magnets 122a-122d define curved surfaces (i.e., arc-like surfaces) which are concentric to the rotation axis. Furthermore, the magnets 122a-122d project in the radial direction rather than the outer surface of the projecting portions 121a-121d. That is, as shown in FIG. 2, when an outside diameter of the outer peripheries of the magnets 122a-122d is defined as Dm, and when an outside diameter of the radially outward surfaces of the projecting portions 121a-121d is defined as Dt, the outside diameter Dm of the magnet 122a-122d is larger than the outside diameter Dt of the projecting portion 121a-121d.

Figure 2:
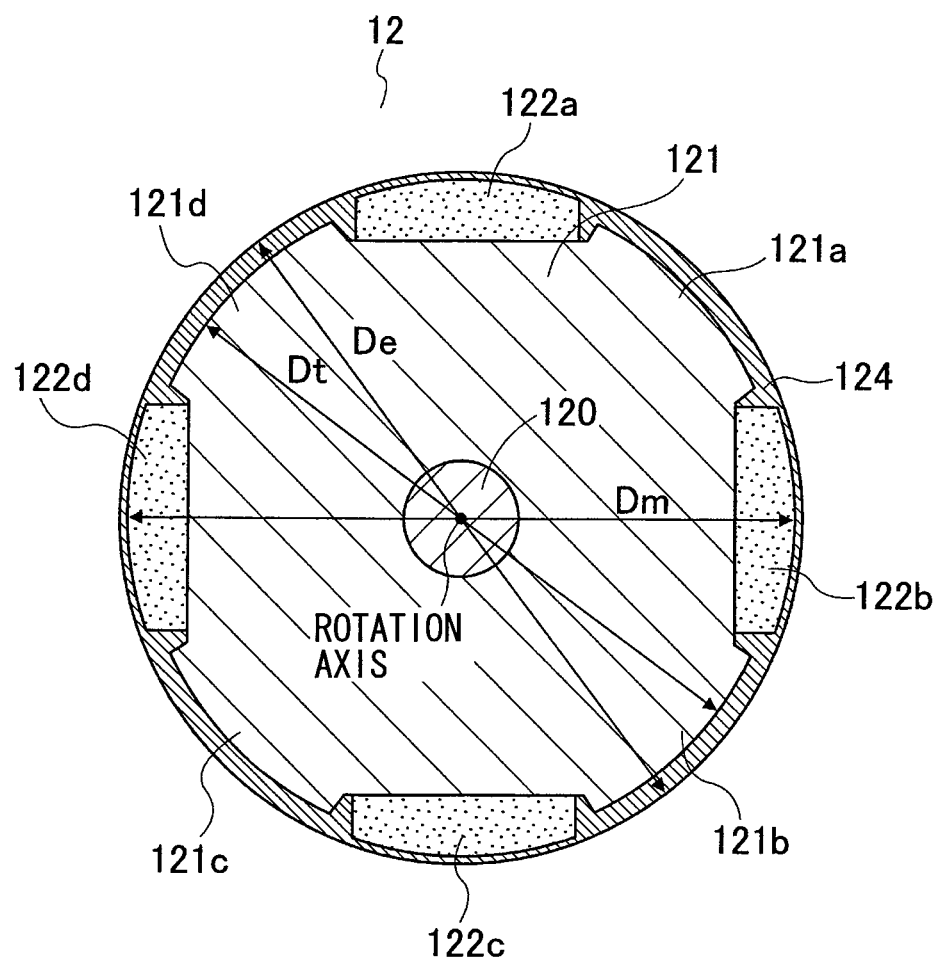
FIG. 2 is a cross-sectional view of a rotor of the motor taken along a line II-II in FIG. 1.
Figure 3:
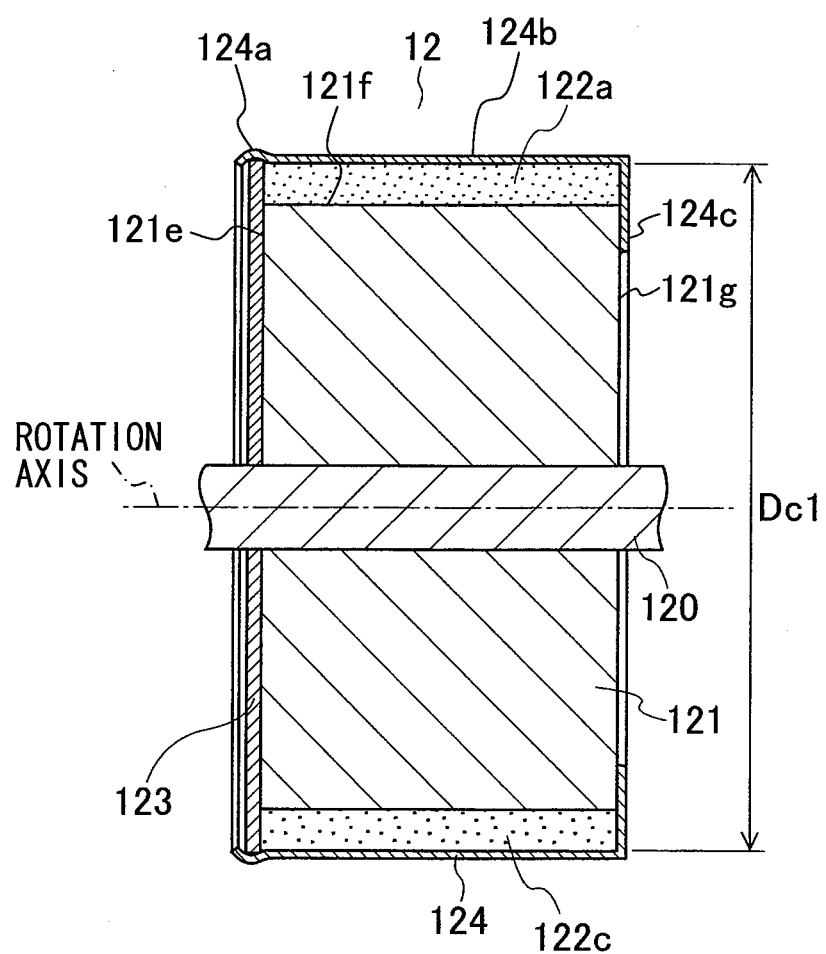
FIG. 3 is an axial sectional view illustrating the rotor according to the first embodiment.

As shown in FIGS. 2 and 3, the end plate 123 is made of a non-magnetic metallic material having a discoid shape, and covers a first end face 121e of the rotator core 121 which is perpendicular to the rotation axis. The end plate 123 is disposed so that the outer periphery edge of the end plate 123 is located away from the rotation axis than the outer periphery edge of the rotator core 121 is. That is, as shown in FIG. 2, when an outside diameter of the end plate 123 is defined as De, the outside diameter De of the end plate 123 is larger than the outside diameter Dm of the magnet 122a-122d. The end plate 123 is fixed to the rotation shaft 120 so as to cover the first end face 121e of the rotator core 121, which is perpendicular to the rotation axis.

The magnet cover 124 is made of a non-magnetic metallic material having a cylindrical shape defined by a thin plate and covers the outer periphery of the rotator core 121. The magnet cover 124 covers an outer circumference face 121f of the rotator core 121 to which the magnets 122a-122d are fixed. Moreover, the magnet cover 124 covers a second end face 121g of the rotator core 121 which is perpendicular to the rotation axis.

As shown in FIG. 3, when an inside diameter of the magnet cover 124, which is taken at a middle portion 124b of the magnet cover 124, is defined as Dc1, the inside diameter Dc1 of the middle portion 124b of the magnet cover 124 is slightly larger than the outside diameter Dm of the magnet 122a-122d. The middle portion 124b of the magnet cover 124 is a generally middle area of the magnet cover 124 in the axial direction.

Moreover, an inside diameter of a first end portion 124a of the magnet cover 124 is larger than the inside diameter Dc1 of the middle portion 124b of the magnet cover 124. Specifically, the inside diameter of the first end portion 124a of the magnet cover 124 is larger than the outside diameter De of the end plate 123.

The magnet cover 124 is disposed so that the middle portion 124b of the magnet cover 124 covers the outer circumference face 121f of the rotator core 121. The first end portion 124a of the magnet cover 124 covers entire edge of the end plate 123. A second end portion 124c of the magnet cover 124, which is an opposite end portion of the first end portion 124a covering the end plate 123, is bent toward the rotation axis along entire periphery edge of the magnet cover 124.

Furthermore, the first end portion 124a of the magnet cover 124 is bent radially inward (i.e., toward the rotation axis), and the first end portion 124a of the magnet cover 124 and the end plate 123 are coupled by crimping (caulking, staking). The second end portion 124c of the magnet cover 124 is bent radially inward so as to cover side faces of the magnets 122a-122d (i.e., right side faces of the magnets 122a-122d in FIG. 1).

A method of assembling the magnet cover 124 to the rotor 12 will be described with reference to FIGS. 4-6.

Figure 4:
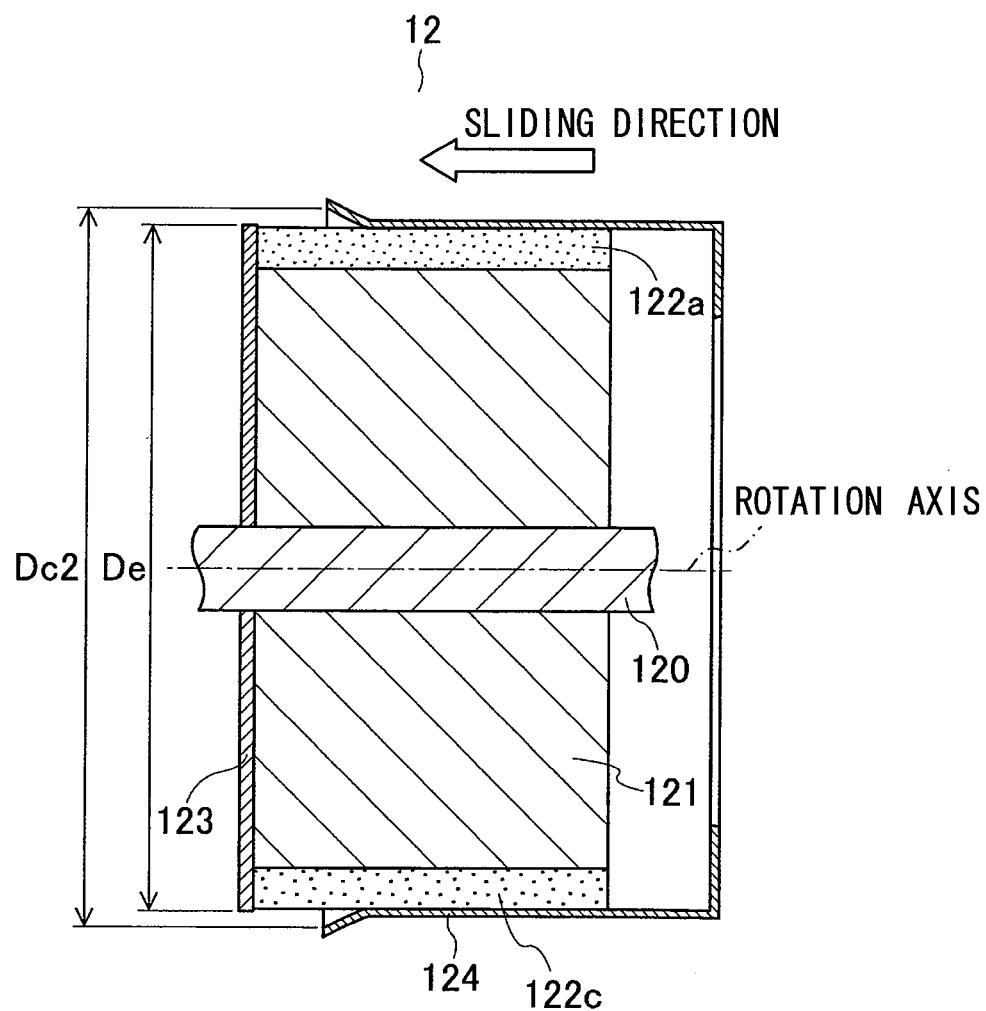
FIG. 4 is an axial sectional view illustrating a process of producing the rotor according to the first embodiment.
Figure 5:
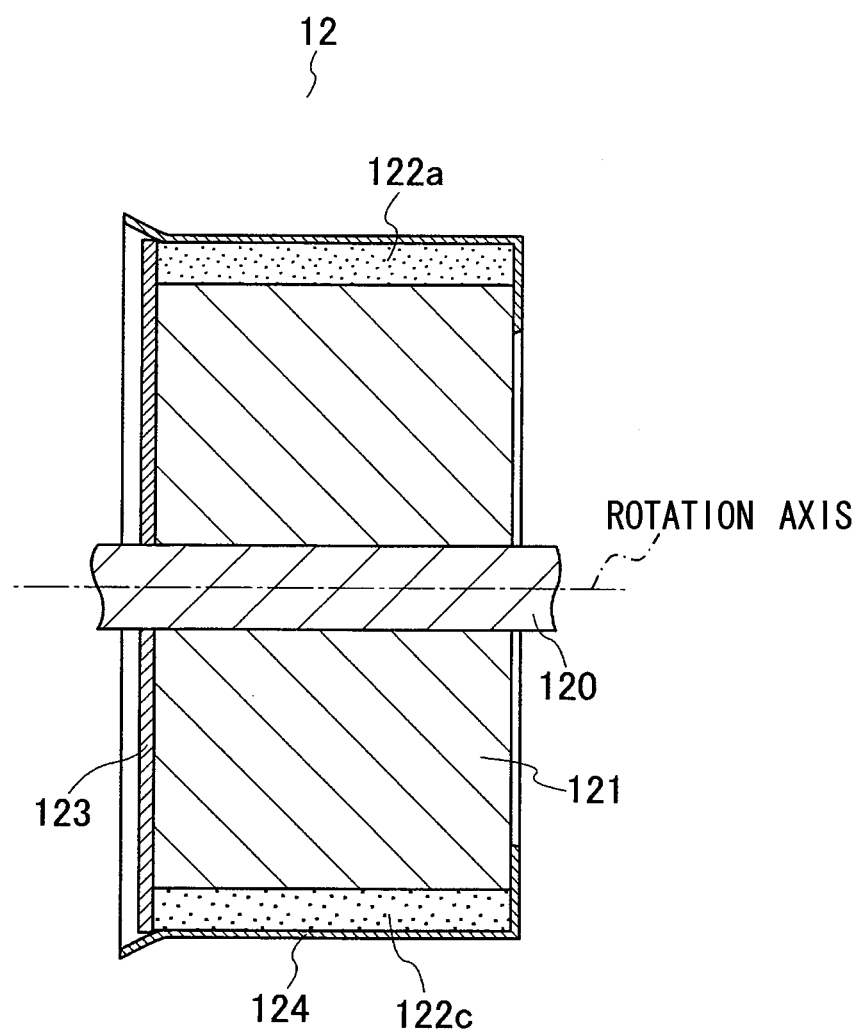
FIG. 5 is an axial sectional view illustrating a process of producing the rotor according to the first embodiment.

As shown in FIG. 4, before the magnet cover 124 is assembled to the rotor 12, an inside diameter Dc2 of the first end portion 124a of the magnet cover 124 is larger than the outside diameter De of the end plate 123. The second end portion 124c of the magnet cover 124 is bent radially inward so as to cover the side faces of the magnets 122a-122d.

The magnet cover 124 is slid in the axial direction (i.e., in a parallel direction parallel to the rotation axis) so as to cover the outer periphery of the rotator core 121. Accordingly, as shown in FIG. 5, the middle portion 124b of the magnet cover 124 covers the outer circumference face 121f of the rotator core 121. The first end portion 124a of the magnet cover 124 covers the edge of the end plate 123, and the second end portion 124c of the magnet cover 124 covers the end face of the magnets 122a-122d.

Figure 6:
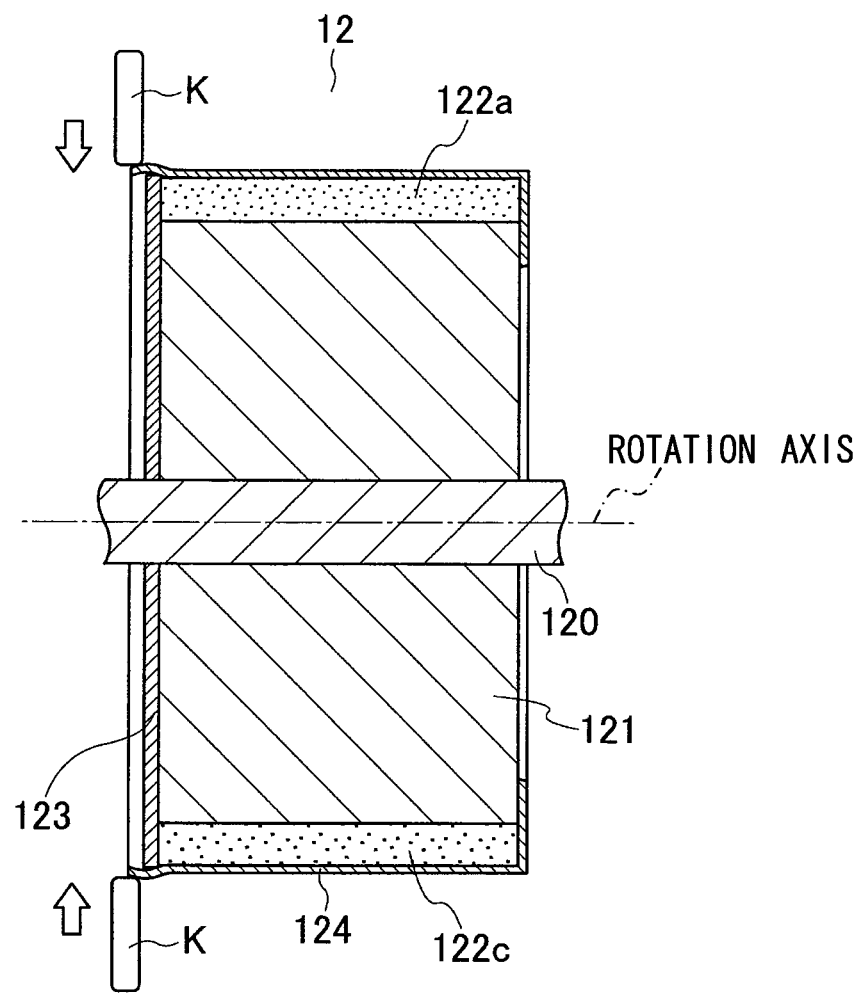
FIG. 6 is an axial sectional view illustrating a process of producing the rotor according to the first embodiment.

As shown in FIG. 6, the first end portion 124a of the magnet cover 124 is bent radially inward along entire circumference edge by using a crimping tool K (caulking tool, staking tool). Therefore, as shown in FIG. 3, the magnet cover 124 and the rotator core 121 are coupled.

Advantages of the first embodiment will be described below.

According to the first embodiment, the magnet cover 124 is disposed so that the middle portion 124b of the magnet cover 124 covers the outer circumference face 121*f* of the rotator core 121. The first end portion 124*a* of the magnet cover 124 covers the outer periphery edge of the end plate 123, and the first end portion 124*a* of the magnet cover 124 is bent radially inward along the entire circumference edge. Therefore, a gap is restricted from arising between the magnet cover 124 and the end plate 123 more certainly than a case where the magnet cover 124 and the end plate 123 just abut with each other. Thus, if the magnets 122*a*-122*d* are chipped off, pieces of the magnets 122*a*-122*d* are certainly restricted from scattering.

According to the first embodiment, the first end portion 124*a* of the magnet cover 124 and the end plate 123 are coupled by crimping (caulking, staking). Therefore, the first end portion 124*a* of the magnet cover 124 is certainly fixed to the end plate 123. Thus, for example, even when the magnet cover 124 and the end plate 123 are vibrated by rotation, the magnet cover 124 and the end plate 123 are restricted from having a gap between each other.

According to the first embodiment, when seen in the axial direction, the outer periphery edge of the end plate 123 is located away from the rotation axis than the outer periphery edge of the rotator core 121 is. Therefore, when the first end portion 124*a* and the second end portion 124*c* of the magnet cover 124 are bent radially inward, the magnets 122*a*-122*d* are restricted from being stressed. Thus, the magnets 122*a*-122*d* are restricted from breaking when the magnet cover 124 is attached to the rotor 12.

According to the first embodiment, the end plate 123 is disposed to cover the first end face 121*e* of the rotator core 121. The first end portion 124*a* of the magnet cover 124 covers the outer periphery edge of the end plate 123, and the first end portion 124*a* of the magnet cover 124 is bent radially inward along the entire circumference edge. Further, the second end portion 124*c* of the magnet cover 124 is bent radially inward along the entire circumference edge so as to cover the side faces of the magnets 122*a*-122*d*. Thus, the magnet cover 124 and the end plate 123 are restricted from having a gap between each other. Moreover, the second end portion 124*c* of the magnet cover 124 and the side faces of the magnets 122*a*-122*d* are also restricted from having a gap between each other.

According to the first embodiment, the rotator core 121 has the projecting portions 121*a*-121*d* distanced from each other with an interval in the circumferential direction, and the projecting portions 121*a*-121*d* project in an opposite direction opposite to the rotation axis. The magnet 122*a*-122*d* is placed between the projecting portions 121*a*-121*d* adjacent with each other. By having such a structure, the magnet cover 124 and the end plate 123 are restricted from having a gap between each other.

According to the first embodiment, the outer periphery edge of the magnet 122*a*-122*d* is located away from the rotation axis in the radial direction than the outer surface of the projecting portion 121*a*-121*d*. By having such a structure, the magnet cover 124 and the end plate 123 are also restricted from having a gap between each other.

(Second Embodiment)

A second embodiment will be described below with reference FIG. 7. According to the second embodiment, a rotor 22 has a first end plate 223*a* and a second end plate 223*b*, while the rotor 12 has one end plate 123 in the first embodiment. Other members, except for the rotor 22, are the same as those of the first embodiment.

The rotor 22 will be described below with reference to FIG. 7.

Figure 7:
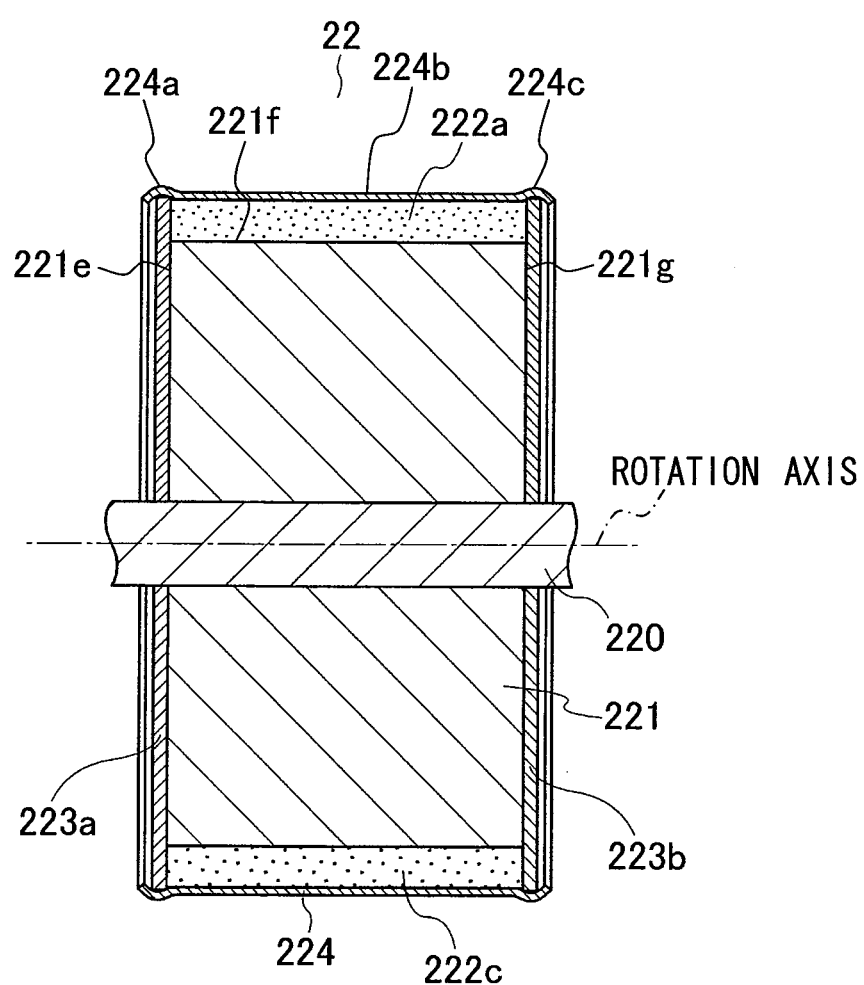
FIG. 7 is an axial sectional view illustrating a rotor according to a second embodiment.

As shown in FIG. 7, the rotor 22 has a rotation shaft 220, a rotator core 221, magnets 222*a*-222*d*, the first end plate 223*a*, the second end plate 223*b*, and a magnet cover 224.

The rotation shaft 220, the rotator core 221, and the magnets 222*a*-222*d* are the same as those of the first embodiment.

The first end plate 223*a* and the second end plate 223*b* are made of a non-magnetic metallic material having a discoid shape. The first end plate 223*a* covers a first end face 221*e* of the rotator core 221, and the second end plate 223*b* covers a second end face 221*g* of the rotator core 221 which is perpendicular to the rotation axis and on an opposite side of the first end face 221*e*. Outer periphery edge of the first end plate 223*a* and the second end plate 223*b* are located outward in the radial direction than an outer periphery edge of the rotator core 221 is as the same as the first embodiment.

For example, an outside diameter of the end plate 223*a*, 223*b* is larger than an outside diameter of the magnet 222*a*-222*d*, which is defined by the outer periphery edge of the magnet 222*a*-222*d*. The first end plate 223*a* is fixed to the rotation shaft 220 so as to cover the first end face 221*e* of the rotator core 221. The second end plate 223*b* is fixed to the rotation shaft 220 so as to cover the second end face 221*g* of the rotator core 221.

The magnet cover 224 is made of a non-magnetic metallic material having a cylindrical shape defined by a thin plate, and covers an outer circumference face 221*f* of the rotator core 221. An inside diameter of the magnet cover 224 taken at a middle portion 224*b* of the magnet cover 224 in the axial direction is slightly larger than the outside diameter of the magnet 222*a*-222*d*. Each inside diameter of a first end portion 224*a* and a second end portion 224*c* is larger than the inside diameter of the middle portion 224*b* of the magnet cover 224. Specifically, the inside diameter of the first end portion 224*a* of the magnet cover 224 is larger than the outside diameter of the first end plate 223*a*. The inside diameter of the second end portion 224*c* of the magnet cover 224 is larger than the outside diameter of the second end plate 223*b*.

The middle portion 224*b* of the magnet cover 224 is disposed so as to cover the outer circumference face 221*f* of the rotator core 221. The first end portion 224*a* of the magnet cover 224 covers the outer periphery edge of the first end plate 223*a* and is bent radially inward along entire circumference edge. The second end portion 224*c* of the magnet cover 224 covers the outer periphery edge of the second end plate 223*b* and is bent radially inward along entire circumference edge. Specifically, the first end portion 224*a* of the magnet cover 224 is bent radially inward along entire circumference edge and coupled with the first end plate 223*a* by crimping (caulking, staking). The second end portion 224*c* of the magnet cover 224 is bent radially inward along entire circumference edge and coupled with the second end plate 223*b* by crimping (caulking, staking). The magnet cover 224 is attached to the rotor 22 in the same way as the first embodiment.

Advantages of the second embodiment will be described below.

According to the second embodiment, the first end plate 223*a* and the second end plate 223*b* cover the first end face 221*e* and the second end face 221*g* of the rotator core 221, respectively. The first end portion 224*a* and the second end portion 224*c* of the magnet cover 224 cover the outer periphery edge of the first end plate 223*a* and the second end plate 223*b*, respectively, and are bent radially inward. Therefore, the magnet cover 224 is restricted from having a gap from the first end plate 223*a* and the second end plate 223*b*.

(Modifications)

In the first embodiment, the magnets 122a-122d project outward in the radial direction so that the outer peripheries of the magnets 122a-122d are located outward than the radially outward surfaces of the projecting portions 121a-121d. Alternatively, the outside diameter Dm defined by the outer peripheries of the magnets 122a-122d may be the same as the outside diameter Dt defined by the radially outward surfaces of the projecting portions 121a-121d.

In the first embodiment, the projecting portions 121a-121d and the magnets 122a-122d are alternately arranged in the circumference direction. Alternatively, the rotator core 121 may not have the projecting portions 121a-121d, and magnets may be fixed to the outer periphery of the rotator core 121 along the entire circumference without the projecting portions 121a-121d. In this case, approximately the same advantages can be achieved as the first embodiment.

In the first embodiment, the radially outward surfaces of the projecting portions 121a-121d and the outer peripheries of the magnets 122a-122d are curved surfaces (i.e., ark-like surfaces) which are concentric to the rotation axis. Alternatively, a curvature radius of the radially outward surfaces of the projecting portions 121a-121d and the outer peripheries of the magnets 122a-122d may be set smaller than that of the first embodiment.

Further, the second end plate 223b of the second embodiment may be coupled with the second end portion 124c of the magnet cover 124 of the first embodiment.

Such changes and modifications are to be understood as being within the scope of the present disclosure as defined by the appended claims.

What is claimed is:

1. A rotor for a rotating electric machine comprising:
   a rotation shaft having a rotation axis;
   a rotator core made of a magnetic material and fixed to the rotation shaft, the rotator core having a first end face and an outer circumference face;
   a plurality of magnets arranged on the outer circumference face of the rotator core;
   an end plate made of a non-magnetic material and having a flat plate shape, the end plate covering the first end face of the rotator core; and
   a magnet cover made of a non-magnetic material and having a cylindrical shape, the magnet cover covering the outer circumference face of the rotator core, wherein
   the end plate has an outside diameter that is larger than both an outside diameter of the rotator core and an outside diameter of the plurality of magnets, the outside diameter of the plurality of magnets being defined as a distance from the rotation axis to an outer surface of the plurality of magnets in a radial direction of the rotation shaft,
   the end plate has a peripheral edge that is defined by an intersection of a surface of the end plate that faces away from the rotator core and a circumferential surface at the outside diameter,
   the magnet cover has a first end portion adjacent to the end plate and a second end portion which is opposite to the first end portion in an axial direction,
   the first end portion of the magnet cover covers the peripheral edge of the end plate,
   the first end portion of the magnet cover is bent toward the rotation axis all around the peripheral edge of the end plate to extend axially beyond the peripheral edge and radially inward from the peripheral edge,
   the end plate has a second peripheral edge that is defined by an intersection of a second surface of the end plate that faces toward the rotator core and the circumferential surface,
   the first end portion contacts at least the second peripheral edge, and
   the first end portion is curved between the peripheral edge and the second peripheral edge both in a circumferential direction and in the axial direction.

2. The rotor according to claim 1, wherein
   the first end portion of the magnet cover and the end plate are coupled by crimping.

3. The rotor according to claim 1, wherein
   the end plate is placed on the first end face of the rotator core, and
   the second end portion of the magnet cover is bent toward the rotation axis so as to cover an end face of the plurality of magnets.

4. The rotor according to claim 1, further comprising:
   an end plate covering a second end face of the rotator core which is opposite to the first end face of the rotator core in the axial direction, wherein
   the second end portion of the magnet cover is bent toward the rotation axis so as to cover an entire outer periphery edge of the end plate covering the second end face.

5. The rotor according to claim 1, wherein
   the rotator core has a plurality of projecting portions which projects outward in a radial direction, and
   the plurality of magnets and the plurality of projecting portions are alternately arranged in a circumference direction.

6. The rotor according to claim 5, wherein
   the plurality of magnets projects outward in the radial direction rather than the plurality of projecting portions projects.

7. The rotor according to claim 1, wherein
   an inside diameter of the first end portion is larger than an inside diameter of a middle portion of the magnet cover.

8. The rotor according to claim 7, wherein
   the outside diameter of the end plate is larger than the inside diameter of the middle portion of the magnet cover.

9. The rotor according to claim 1, wherein
   the outside diameter of the end plate is larger than an inside diameter of a middle portion of the magnet cover.

10. The rotor according to claim 1, wherein
    the first end portion of the magnet cover is flared radially outward at a position axially inward from where the first end portion is bent toward the rotation axis.

11. The rotor according to claim 1, wherein
    an inside diameter of the first end portion is larger than an inside diameter of a middle portion of the magnet cover, and
    the outside diameter of the end plate is larger than the inside diameter of the middle portion of the magnet cover.

12. The rotor according to claim 1, wherein
    the first end portion of the magnet cover is bent away from the rotational axis immediately adjacent to where the first end portion of the magnet cover is bent toward the rotation axis.

13. The rotor according to claim 1, wherein
    the first end portion contacts the peripheral edge and the second peripheral edge.

14. The rotor according to claim 1, wherein
the first end portion is spaced away from the circumferential surface to include a radial gap between the peripheral edge and the second peripheral edge.

\* \* \* \* \*